United States Patent
Marinier et al.

(10) Patent No.: US 7,349,376 B2
(45) Date of Patent: *Mar. 25, 2008

(54) DYNAMIC FORWARD ERROR CORRECTION IN UTRA SYSTEMS

(75) Inventors: Paul Marinier, Brossard (CA); Angelo Cuffaro, Laval (CA); Christopher Cave, Candiac (CA)

(73) Assignee: Interdigital Technology Corporation, Wilmington, DE (US)

( * ) Notice: Subject to any disclaimer, the term of this patent is extended or adjusted under 35 U.S.C. 154(b) by 37 days.

This patent is subject to a terminal disclaimer.

(21) Appl. No.: 11/196,223

(22) Filed: Aug. 3, 2005

(65) Prior Publication Data

US 2006/0029098 A1 Feb. 9, 2006

Related U.S. Application Data

(63) Continuation of application No. 10/329,308, filed on Dec. 23, 2002, now Pat. No. 6,967,940.

(60) Provisional application No. 60/397,360, filed on Jul. 19, 2002.

(51) Int. Cl.
*H04B 7/216* (2006.01)

(52) U.S. Cl. .................. 370/335; 370/342; 375/140

(58) Field of Classification Search .............. 370/140, 370/335, 342, 280, 294, 336–337, 347–348, 370/436, 442
See application file for complete search history.

(56) References Cited

U.S. PATENT DOCUMENTS

| | | | |
|---|---|---|---|
| 5,790,534 A | 8/1998 | Kokko et al. | |
| 5,983,185 A | 11/1999 | Cuffaro et al. | |
| 6,137,772 A | 10/2000 | Turcotte et al. | |
| 6,330,429 B1 | 12/2001 | He | |
| 6,385,173 B1 | 5/2002 | Lindskog et al. | |
| 6,490,461 B1 | 12/2002 | Müller | |
| 6,496,492 B1 | 12/2002 | Zeng | |
| 6,639,908 B1 | 10/2003 | Silventoinen et al. | |
| 6,675,016 B2 | 1/2004 | Lucidarme et al. | |
| 6,724,742 B1 | 4/2004 | Mun et al. | |
| 6,747,958 B2 | 6/2004 | Vayanos et al. | |
| 6,775,254 B1 | 8/2004 | Willenegger et al. | |
| 6,788,657 B1 | 9/2004 | Freiberg et al. | |
| 6,791,963 B1 | 9/2004 | Hwang et al. | |
| 6,798,826 B1 | 9/2004 | Shiu et al. | |
| 6,807,192 B2 | 10/2004 | Terry | |
| 2001/0043576 A1 | 11/2001 | Terry | |
| 2002/0001287 A1 | 1/2002 | Bergenwall et al. | |
| 2002/0021698 A1 | 2/2002 | Lee et al. | |
| 2002/0042283 A1 | 4/2002 | Moulsley | |
| 2002/0071407 A1 | 6/2002 | Koo et al. | |
| 2003/0067905 A1 | 4/2003 | Belaiche | |

*Primary Examiner*—Bunjob Jaroenchonwanit
*Assistant Examiner*—Van Kim T. Nguyen
(74) *Attorney, Agent, or Firm*—Volpe and Koenig, P.C.

(57) ABSTRACT

In a wireless communication system using multiplexed transport channels in combinations thereof on a coded composite transport channel (CCTrCh), a system for dynamically varying the combinations of transport channels includes configuring means for configuring mutually exclusive dedicated transport channels based on semi-static transport parameters, and mapping means for mapping data to a channel selectively based on a preferred semi-static transport parameter, wherein the mutually exclusive dedicated transport channels are not multiplexed together onto the CCTrCh.

8 Claims, 2 Drawing Sheets

DYNAMIC FORWARD ERROR CORRECTION IN UTRA SYSTEMS

CROSS REFERENCE TO RELATED APPLICATIONS

This application is a continuation of U.S. patent application Ser. No. 10/329,308, filed Dec. 23, 2002 now U.S. Pat. No. 6,967,940, which claims priority from U.S. Provisional Application No. 60/397,360, filed Jul. 19, 2002, which are incorporated by reference as if fully set forth herein.

BACKGROUND

The proposed invention relates to UMTS 3$^{rd}$ Generation (3G) wireless communications. More specifically, it considers the Time Division Duplex (TDD) mode of operation using dynamic link adaptation (DLA).

A variety of services, such as video, voice and data, each having different Quality of Service (QoS) requirements, can be transmitted using a single wireless connection. This is accomplished by multiplexing several transport channels onto a coded composite transport channel (CCTrCh). The CCTrCH is then mapped onto physical channels for transport over the air interface. Each transport channel is associated with a transport format set (TFS), which defines a set of allowed transport formats (TF). Parameters such as transport block size and transport block set size are considered dynamic since they can vary within a TFS. In contrast, semi-static parameters cannot be dynamically changed for a given transport channel. Rather, they can only be changed after Radio Resource Control (RRC) signaling has been exchanged between the user equipment (UE) and the UMTS Terrestrial Radio Access Network (UTRAN). The time expenditure of this exchange to adjust semi-static parameters can have unacceptable consequences with respect to timely mitigation of an RF propagation failure.

Forward error correction (FEC) coding type and rate are semi-static parameters that are identical for each TF within a TFS. An FEC coding rate of 1/2 indicates roughly 2 times as many bits are required to transmit 1 bit of information, while a 1/3 rate means there are about 3 times as many bits. A coding rate of 1/2 allows one extra FEC bit to be added for each data bit. For coding rate 1/3, two extra FEC bits are added for each data bit. This allows the timeslot to tolerate a lower SIR.

There are a variety of possible combinations when multiplexing several transport channels onto a CCTrCh. A particular transport format combination (TFC) specifies the transport format of each of the multiplexed channels. A TFC set is a set of allowed TFCs.

A transport format combination indicator (TFCI) is an indicator of a particular TFC, and is transmitted to the receiver to inform the receiver which transport channels are active for the current frame. The receiver, based on the reception of the TFCIs, will be able to interpret which physical channels and which timeslots have been used. Accordingly, the TFCI is the vehicle which provides coordination between the transmitter and the receiver such that the receiver knows which physical transport channels have been used.

FIG. 1A shows a UTRA protocol stack, which contains the following lower layers: radio link control (RLC), medium access control (MAC) and physical (PHY).

The RLC layer delivers logical channels bearing control information to the MAC layer. These channels are the dynamic control channel (DCCH), which includes set-up information, and the dynamic traffic channel (DTCH), which carries user data such as voice and data.

The MAC layer maps the logical channels DCCH and DTCH to different transport channels (DCHs), which are then delivered to the PHY layer. The MAC layer is responsible for selecting the TFC for combination of transport channels DCH within the CCTrCH. This selection occurs at every transmission time interval (TTI), which is the period of time for one data burst. For example, a 20 ms TTI represents a transmittal of data specified in the TF every 20 ms (typically amounting to two 10 ms frames). Typically, there are 15 timeslots in each frame. The TFC selection is based on the amount of buffered data of each logical channel and the UE transmission power on the uplink (UL) communication. The TFC defines all of the dynamic and semi-static parameters for each transport channel within the CCTrCH. The selected TFC and associated data for each UL CCTrCH is provided to the physical layer for transmission. If the physical layer subsequently determines transmission of this TFC exceeds the maximum or allowable UE transmission power, a physical status indication primitive is generated to the MAC to indicate that maximum power or allowable transmission power has been reached.

FIG. 1B shows a block diagram of the PHY layer combining transport channels DCH_A, DCH_B and DCH_C on the CCTrCH and mapping them into physical channels for transmission over the air interface. A data burst occurs as one coded packet of data is mapped in one time slot on the physical channel. The PHY layer is responsible for performing the channel coding of transport channels DCH, including any forward error correction (FEC). Among the parameters contained in the TFC are the defined FEC coding types and rates. The system chooses, on a TTI basis, which transport channels will be active and how much data will be transmitted in each one. That is, the TFC selection is fixed for the duration of the TTI, and can only be changed at the commencement of the next TTI period. The TFC selection process takes into account the physical transmission difficulties, (maximum allowable power being one), and reduces the physical transmission requirements for some time duration.

After the multiple transport channels are combined into a single CCTrCh, the CCTrCh is then segmented and those segments are mapped separately onto a number of physical channels. In TDD systems, the physical channels may exist in one, or a plurality of different timeslots, and may utilize a plurality of different codes in each timeslot. Although there are as many as 16 possible codes in a timeslot in the downlink, it is more typical to have, for example, 8 codes in a particular downlink in a particular timeslot. A connection can be assigned as many as 16 codes in a downlink timeslot. In the UL, the UE is limited to using two codes in any particular timeslot. There are a number of physical channels defined by a plurality of codes in a plurality of timeslots. The number of physical channels assigned per connection can vary.

In the UL, there are rarely more than two codes in a particular timeslot. In any event, there are a number of physical channels defined by a plurality of codes in a plurality of timeslots. The number of physical channels can vary.

Dynamic link adaptation (DLA) is a fast adjustment mechanism performed by the UE to combat difficult RF propagation conditions. When a UE reaches its maximum transmission power, it can reduce its data rate, typically by ½, in an attempt to correct signal to interference ratio (SIR), by restricting its TFC set to combinations having lower power requirements. For example, in a simple case having a single transport channel, and the TFC corresponding to the allowed transport formats of the transport channel DCH, such a transport channel may support data rates of 0, 16, 32, 64, and 128 kbps. In this example the TFC set would be (TF0, TF1, TF2, TF3, TF4), where TF0=0 kbps, TF1=16 kbps, TF2=32 kbps, TF3=64 kbps, TF4=128 kbps. Since transmitting at a higher data rate requires more power, the data rate is limited during times of congestion by restricting the TFC set to (TF0, TF1, TF2 TF3). This eliminates the possibility of the higher data rate TF4 being used. Blocked TFCs may be later restored to the set of available TFCs by unblocking them in subsequent periods when the UE transmission power measurements indicate the ability to support these TFCs with less than or equal to the maximum or allowed UE transmission power.

In the 3GPP UTRAN TDD standard, it is specified that physical resources (i.e., data) must be assigned in the PHY layer in sequential order, first by timeslot and then by code. Thus, during each data burst, the first code of the first timeslot is assigned, then the second code of the first timeslot and so on until the first timeslot is completely assigned. The assignment of data continues with the first code of the next consecutive timeslot, the second code of that timeslot, and so on for the necessary number of available timeslots and codes until data resource requirements are satisfied. Upon degraded RF conditions, DLA decreases the data rate and hence reduces the amount of required physical resources per TTI. However, the UE assigns physical resources to timeslots within the frame in consecutive order, regardless of RF conditions for a particular timeslot. As a result, if the first few timeslots are the ones having poor SIR, the later timeslots with potentially more favorable RF conditions are not utilized or underutilized.

SUMMARY OF THE INVENTION

A UE transmitter in a 3G UTRAN wireless communication system performs dynamic link adaptation (DLA) with dynamic semi-static parameters for overcoming RF propagation difficulties. Separate transport channels (DCH) are defined for each semi-static parameter, including forward error coding (FEC) coding type and rate. When data rate is decreased during DLA, a TFC is selected having the desired FEC coding type and rate. Since this adjustment occurs at each TTI, mapping of data packet codes in each timeslot on the physical channel includes the benefit of FEC rather than reduced data rate alone. This permits improved SIR in a timeslot that may be experiencing RF propagation difficulties during the UL mapping process.

In a wireless communication system using multiplexed transport channels in combinations thereof on a CCTrCh, a system for dynamically varying the combinations of transport channels includes configuring means for configuring mutually exclusive dedicated transport channels based on semi-static transport parameters, and mapping means for mapping data to a channel selectively based on a preferred semi-static transport parameter, wherein the mutually exclusive dedicated transport channels are not multiplexed together onto the CCTrCh.

DETAILED DESCRIPTION OF THE PREFERRED EMBODIMENTS

Although the following description of the present invention is within the context of TDD, it is applicable to both FDD and TDD modes of operation. DLA enhanced by dynamic forward error correction (FEC) is useful to either an FDD or TDD UE that reaches maximum transmission power.

The UE transmits both control plane information of the dedicated control channel (DCCH) and user plane data of the dedicated traffic channel (DTCH) on the same connection. Table 1 shows a UE's TFC set simplified for illustrative purposes, comprising five transport channels DCH1, DCH2, DCH3, DCH4 and DCH5. For this example, the transport channels are mapped by the MAC layer upon radio access bearer establishment (i.e., UE call setup) such that the DCCH is mapped to DCH1 and the DTCH is mapped to one from the group DCH2 to DCH5. The transport channels DCH2 to DCH5 have user plane data that is predefined for semi-static parameters by a system radio network controller (RNC). These transport channels DCH2 to DCH5 can easily be stored by the RNC in a lookup table.

As shown in Table 1, a TFCI value is assigned to each possible TFC and the presence of control data for each channel is indicated by 'X'. In this example, DCH2 to DCH5 are mutually exclusive, and hence, never multiplexed together onto the CCTrCh. The CCTrCh, therefore, never contains more than one user plane DCH.

TABLE 1

TFC Set with mutually exclusive DTCH mapping

| TFCI | DCCH | DTCH | | | |
| --- | --- | --- | --- | --- | --- |
| | DCH1 | DCH2 | DCH3 | DCH4 | DCH5 |
| 1 | X | | | | X |
| 2 | X | | | X | |
| 3 | X | | X | | |
| 4 | X | X | | | |
| 5 | | | | | X |
| 6 | | | | X | |
| 7 | | | X | | |
| 8 | | X | | | |

Figure 1A:
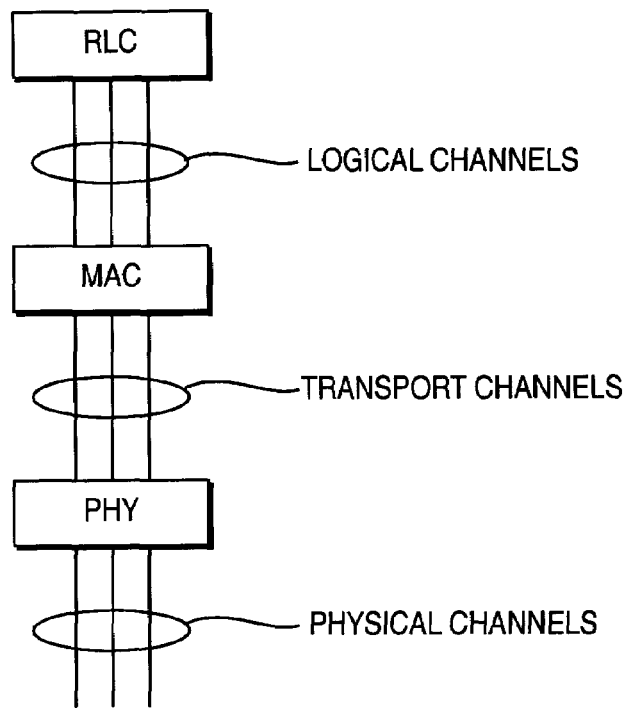
FIG. 1A shows a representation of a UTRA protocol stack of layers and channels.
Figure 1B:
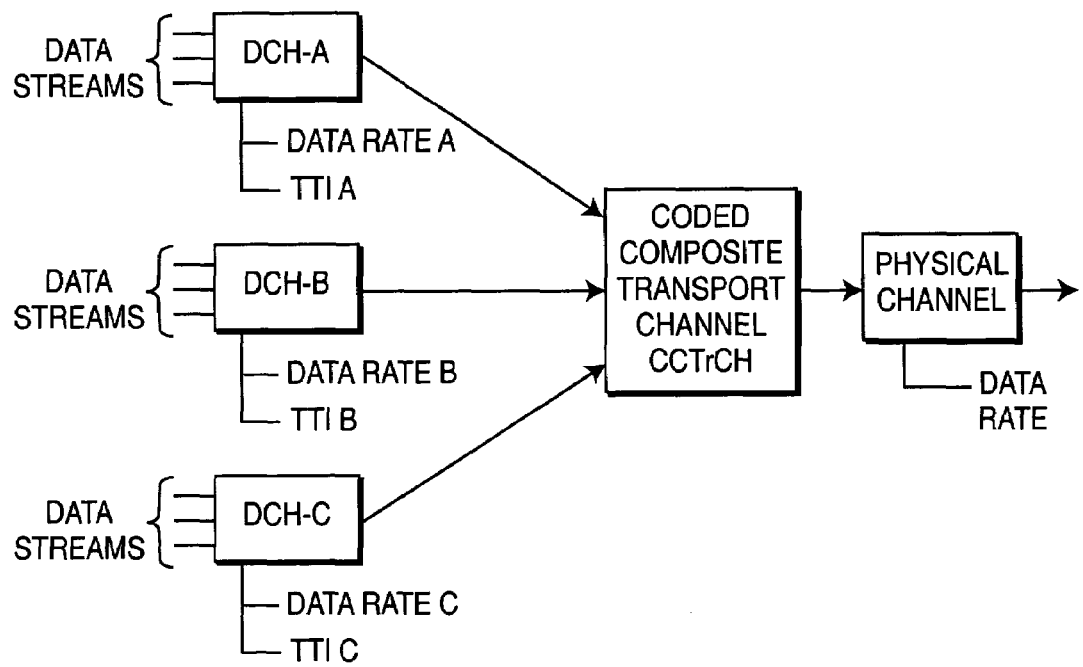
FIG. 1B shows a block diagram of transport channels being mapped in the physical layer.
Figure 2:
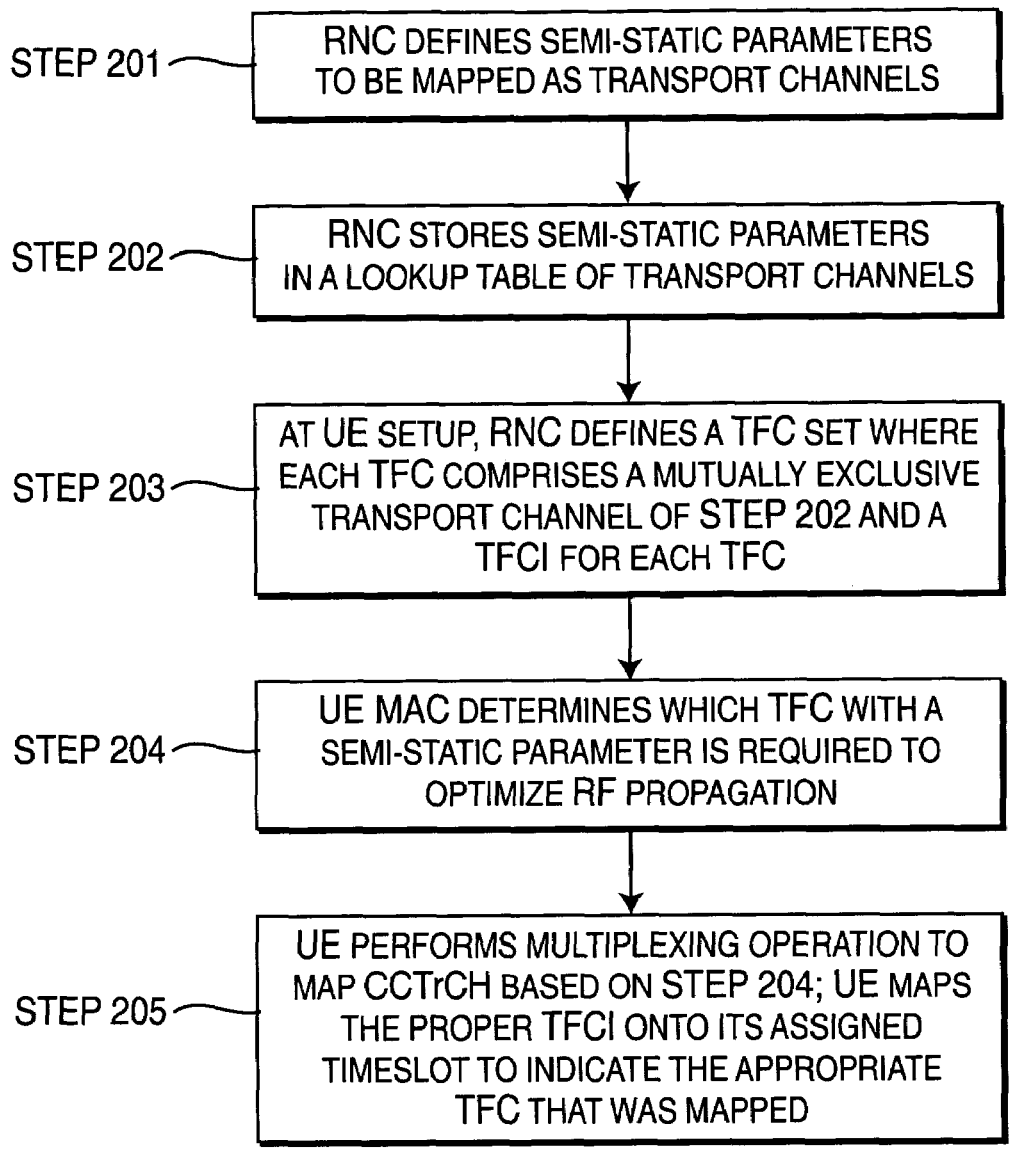
FIG. 2 shows a flowchart for a dynamic FEC method.

In this example, the semi-static parameters assigned to transport channels are forward error correction (FEC) coding type and rate combinations. In a 3G UTRAN system, there are typically four FEC coding combinations: no coding, convolutional 1/2 rate, convolutional 1/3 rate and turbo 1/3 rate. Accordingly, the transport channels in FIG. 2 are defined as DCH2=no coding; DCH3=convolutional 1/2; DCH4=convolutional 1/3; and DCH5=turbo 1/3.

The UE can dynamically change the TFC every TTI, depending on the desired FEC coding. When a high coding rate is desired, such as convolutional 1/3, the UE selects a TFC containing DCH4, by setting TFCI=2 or 6. When a lower rate is desired, such as convolutional 1/2, the UE selects a TFC containing DCH3, by setting TFCI=3 or 7. All five channels DCH1, DCH2, DCH3, DCH4 and DCH5 are defined, but only one of the user plane transport channels DCH2 to DCH5 will be mapped onto the CCTrCh, depending on the value of TFCI. The control plane transport channel DCH1 is optionally mapped onto the CCTrCH.

When used in conjunction with DLA, the dynamic control of the FEC coding as described above maintains the same number of physical resources for active timeslots while reducing their transmission power requirements. More specifically, the data rate is reduced by DLA when, due to poor SIR, it is decided that the current number of PHY channels cannot be supported. Although the rate is reduced in conventional DLA, there may not be an improvement in SIR if the timeslot experiencing high interference is the first timeslot in which the user data is transmitted. Conventional DLA would continue reducing the rate until the number of bits transmitted in the first timeslot were reduced. With the lesser data rate, less timeslots and codes of timeslots are assigned, leading to under utilized PHY channel capacity. However, with dynamic adjustment of the FEC coding operating concurrently, those unassigned timeslots and codes of timeslots are available to accept the additional FEC bits. Thus, the data mapped on the PHY channels will have improved SIR as a consequence of the adjusted FEC coding, in addition to the reduced data rate by the DLA. By allocating more FEC bits, the required transmission power is reduced for the same target quality of service (QoS). Furthermore, the number of PHY channels can be maintained at full capacity, which takes advantage of all possible timeslots, so that those having the best RF propagation potential are not eliminated from contention during mapping on the UL.

The present invention is not limited to dynamic control of a single semi-static parameter. Alternative embodiments involving dynamic control of any semi-static parameter are within the scope of the present invention. Examples of these parameters are the rate matching parameter and cyclic redundancy code (CRC) size. The UE must be configured such that a logical channel can be mapped to one of many transport channels.

FIG. 2 shows a flowchart for a dynamic FEC method. In step 201, the various semi-static parameters, such as FEC coding type and rate, are determined and defined for potential mapping as transport channels DCH. These are stored in a lookup table in step 202 by the RNC. At step 203, upon UE setup, the RNC creates a set of TFCs such that each semi-static parameter is represented mutually exclusive for each TFCI. In step 204, the MAC of the UE selects the TFC from the TFC set having the optimum semi-static parameters for the present UE transmission power conditions. At step 205, the logical channels DTCH and DCCH are mapped as transport channels DCH to the CCTrCh by multiplexing based on the decision of step 204, and the appropriate TFCI is mapped onto the UE's timeslot to indicate the mapped TFC for the UL communication. Steps 204 and 205 repeat at every TTI on the UL, concurrently with DLA, to dynamically adjust FEC or other semi-static parameters within the selected TFC.

What is claimed is:

1. A radio network controller (RNC) using multiplexed transport channels in combinations thereof on a coded composite transport channel (CCTrCh) for dynamically varying the combinations of transport channels, comprising:
a processing unit for configuring mutually exclusive dedicated transport channels based on semi-static transport parameters and
mapping data to a channel selectively based on a preferred semi-static transport parameter, wherein the mutually exclusive dedicated transport channels are not multiplexed together onto the CCTrCh.

2. The RNC according to claim 1, wherein said processing unit
further defines transport format combinations (TFCs) each with a mutually exclusive semi-static transport parameter and
stores the TFCs in a lookup table.

3. The RNC according to claim 2, wherein a TFC with the desired semi-static transport parameter at every transmission time interval is dynamically selected.

4. The RNC according to claim 2, wherein the semi-static transport parameter is determined by a user equipment medium access control layer.

5. The RNC according to claim 1, wherein the semi-static transport parameter is forward error correction coding type and rate.

6. The RNC according to claim 1, wherein the semi-static transport parameter is cyclic redundancy code size.

7. The RNC according to claim 1, wherein the semi-static transport parameter is rate matching.

8. The RNC according to claim 1, wherein the semi-static transport parameters are optimized for transmission power conditions of a user equipment.

* * * * *